US 012253687B2

(12) United States Patent
Olkkonen (10) Patent No.: US 12,253,687 B2
(45) Date of Patent: Mar. 18, 2025

(54) GRATING ARRANGEMENTS (71) Applicant: DISPELIX OY, Espoo (FI)

(72) Inventor: Juuso Olkkonen, Espoo (FI)

(73) Assignee: DISPELIX OY, Espoo (FI)

( * ) Notice: Subject to any disclaimer, the term of this patent is extended or adjusted under 35 U.S.C. 154(b) by 876 days.

(21) Appl. No.: 17/424,133

(22) PCT Filed: Apr. 15, 2020

(86) PCT No.: PCT/FI2020/050242
§ 371 (c)(1),
(2) Date: Jul. 19, 2021

(87) PCT Pub. No.: WO2020/212647
PCT Pub. Date: Oct. 22, 2020

(65) Prior Publication Data
US 2022/0099990 A1   Mar. 31, 2022

(30) Foreign Application Priority Data

Apr. 16, 2019  (FI) ..................... 20195309

(51) Int. Cl.
*G02B 27/42* (2006.01)
*G02B 27/01* (2006.01)

(52) U.S. Cl.
CPC ..... *G02B 27/4205* (2013.01); *G02B 27/0172* (2013.01); *G02B 2027/0123* (2013.01)

(58) Field of Classification Search
CPC ............ G02B 27/4205; G02B 27/0172; G02B 2027/0123; G02B 6/34; G02B 5/1866; G02B 27/0101; G02B 27/42
See application file for complete search history.

(56) References Cited

U.S. PATENT DOCUMENTS

| 2010/0321781 | A1  | 12/2010 | Levola et al. |
| 2011/0019874 | A1* | 1/2011  | Jarvenpaa ............... A61B 3/113 382/103 |
| 2017/0299864 | A1* | 10/2017 | Vallius ............... G02B 27/0081 |

(Continued)

FOREIGN PATENT DOCUMENTS

| WO | 2018178626 A1 | 10/2018 |
| WO | 2018202951 A1 | 11/2018 |
| WO | 2018231754 A1 | 12/2018 |

OTHER PUBLICATIONS

European Search Report dated Nov. 9, 2022 in Application 20790506.

*Primary Examiner* — Balram T Parbadia
*Assistant Examiner* — Gabriel A Sanz
(74) *Attorney, Agent, or Firm* — Maschoff Brennan (57) ABSTRACT The invention concerns a diffractive waveguide element for a personal display device, the element comprising a waveguide body (21), and at least two grating regions (23, 24) arranged on the waveguide body (21), at least some of the grating regions adapted to expand the exit pupil of the element. According to the invention, the grating regions (23, 24) are positioned with respect to each other so that and are provided with gratings having different grating vectors so that the grating regions (23, 24) interact to combine the functions of exit pupil expansion and outcoupling on at least some parts of the element. The invention allows for efficient use of waveguide area.

17 Claims, 9 Drawing Sheets (56) References Cited

U.S. PATENT DOCUMENTS

| | | | |
|---|---|---|---|
| 2017/0299865 A1 | 10/2017 | Vallius et al. | |
| 2017/0322426 A1 | 11/2017 | Tervo | |
| 2018/0284439 A1* | 10/2018 | Vallius | G02B 5/1842 |
| 2020/0116995 A1* | 4/2020 | Chi | G02B 6/0035 |
| 2020/0209630 A1* | 7/2020 | Schultz | G02B 27/0081 |
| 2020/0225479 A1* | 7/2020 | Chi | G02F 1/011 |
| 2022/0206300 A1* | 6/2022 | Park | G02B 5/1823 |

* cited by examiner

GRATING ARRANGEMENTS

FIELD OF THE INVENTION

The invention relates to optical devices. In particular, the invention relates to grating arrangements of diffractive waveguides used in personal display devices such as near-to-eye displays (NEDs), head-mounted displays (HMDs) and head-up displays (HUDs). More specifically, Grating arrangements for a large field of view waveguides with a compact form factor are disclosed.

BACKGROUND OF THE INVENTION

NEDs, HMDs, and HUDs typically contain a projector and a combiner element. The projector produces a virtual image that is overlaid on top of the user's real-world view with the aid of the combiner element. In NEDs and HMDs, the combiner element is typically a semi-transparent and is located at a distance of 1-3 cm from the eye. The combiner element can be a semi-transparent mirror or a more complicated optical assembly, such as a diffractive, holographic or reflective lightguide, or a free-form prism. Diffractive waveguides typically contain an in-coupling (IC), exit pupil expansion (EPE) and an out-coupling (OC) grating. These gratings regions are in traditional designs spatially separated. The size of the EPE and OC gratings increases with the increasing field of view (FOV) and the eyebox size. This prevents the usage of this approach for high FOV (>50 degrees) wearable NED devices.

Figure 1:
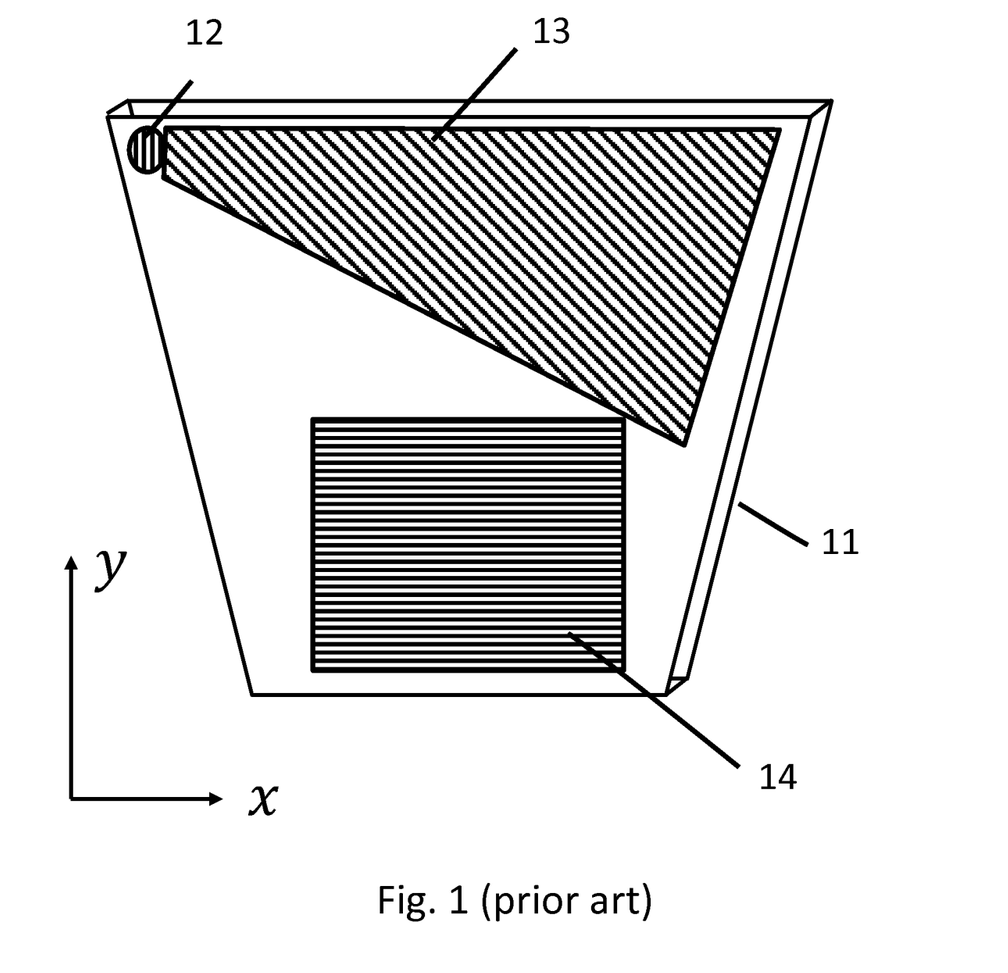
FIG. 1 shows a traditional diffractive waveguide with exit pupil expansion.

To exemplify the problem, when the display design disclosed in US 2016/0231568 A1 is applied for a 50 deg FOV NED display with 15 mm×10 mm (height×width) eyebox and 20 mm eye relief, a structure shown in FIG. 1 is obtained. The structure comprises a waveguide 11, an IC 12, an EPE 13 and an OC 14. Due to the large FOV, EPE 13 is vertically and horizontally bigger than the out-coupling grating 14. The total size of the lightguide is 77 mm×52 mm (height×width) which too large for compact eyewear-like NEDs.

Thus, there is a need for improved diffractive display solutions.

SUMMARY OF THE INVENTION

It is an aim of the invention to provide a waveguide element whose area is efficiently used. A specific aim is to provide a solution by means of which the ratio of display area to overall area of the waveguide can be increased.

In particular, it is an aim to provide grating arrangements for high field of view diffractive waveguides with a form factor compatible with wearable NEDs, in particular eyeglass form factor NEDs and other compact form factor devices.

One aim is to provide a solution suitable for see-through or augmented reality devices.

The invention is based on the idea of combining the functions of exit pupil expansion and out-coupling in the waveguide element. There are several ways of achieving this in practice, using suitable configurations of grating region positions and grating patterns therein.

Thus, according to one aspect, there is provided a diffractive waveguide element for a personal display device, comprising a waveguide body, and at least two grating regions arranged on the waveguide body, at least some of the grating regions adapted to expand the exit pupil of the element. According to the invention, the grating regions are positioned and provided with gratings so that the grating regions interact to combine the functions of exit pupil expansion and out-coupling on at least some positions of the element.

The first and second grating regions can in general be located on the same or different sides of the waveguide in non-overlapping or overlapping positions. Several exemplary configurations are discussed below.

According to another aspect, there is provided a personal display device comprising a waveguide element as disclosed herein and having also at least one in-coupling region. Additionally, the device comprises at least one projector for directing an image on the in-coupling grating, from which it is diffracted into the waveguide and proceeds to the grating regions, where the exit pupil is expanded and image out-coupled due to the first and second gratings.

According to a still another aspect there is provided a method of providing an image on a personal see-through display device, the method comprising coupling an image into a waveguide body using an in-coupler as propagating rays, allowing the exit pupil of a first part of the in-coupled propagating rays to expand in the waveguide by means of a first grating arranged on the waveguide, from which the expanded rays propagate to a second grating arranged on the waveguide and having a different grating vector than the first grating so as to out-couple therefrom, allowing the exit pupil of a second part, different from the first part, of the in-coupled propagating rays to expand in the waveguide by means of the second grating, from which the expanded rays propagate to the first grating so as to out-couple therefrom.

The invention offers considerable benefits. The main benefit is small footprint of the element compared with the effective out-coupling area of the element. This allows for e.g. eyeglass glass sized display elements with large exit pupil and FOV.

The invention also allows for, as exemplified by embodiments described later, a high FOV of 50×90 deg (Horizontal×Vertical) with a single projector and in-coupling region and a very high FOV of 100×90 deg (H×V) with two projectors and in-coupling regions to be propagated in the waveguide (with refractive index of 2.0 of the waveguide).

Next, selected embodiments of the invention as advantages thereof are discussed with reference to the attached drawings.

DETAILED DESCRIPTION OF EMBODIMENTS

As discussed above, to reduce the surface area required by gratings, the optical functions of EPE and OC grating need to be combined.

In some embodiments, there are at least two grating regions on or in the waveguide, the regions comprising a first grating region provided with a first grating, the first grating region being positioned on a first location of the waveguide body, and a second grating region provided with a second grating, the second grating region being positioned on a second location of the waveguide body, different from the first location. The second grating is arranged to out-couple rays that have been spread, i.e. whose exit pupil has been expanded, by the first grating. On the other hand, the first grating out-couples rays whose exit pupil has been expended by the second grating.

Figure 2:
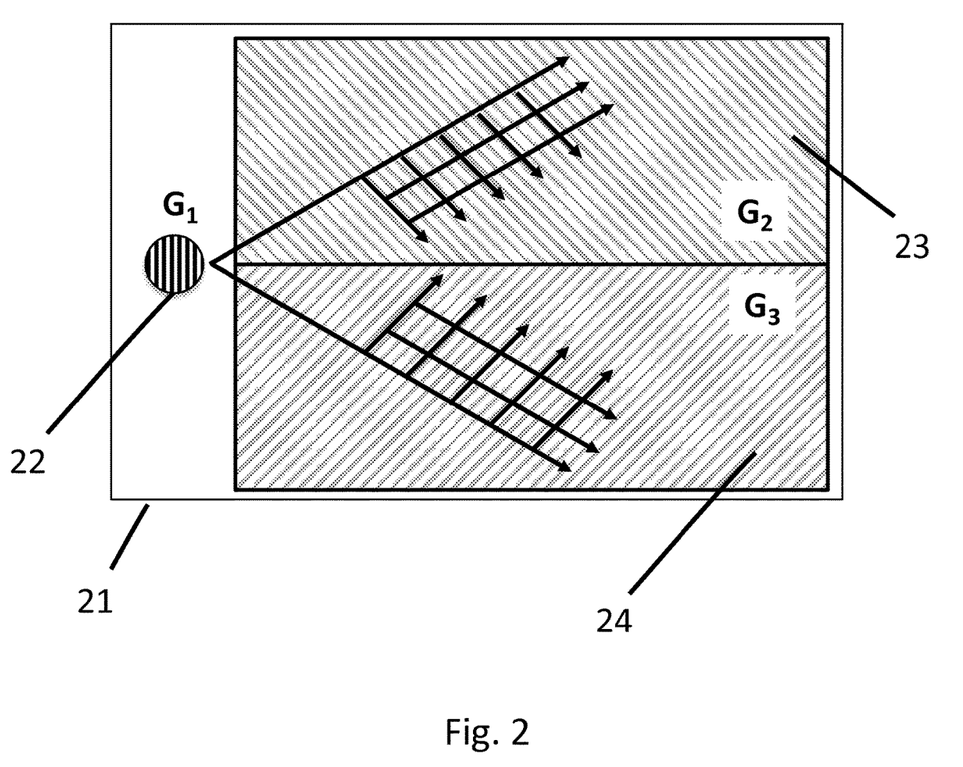
FIG. 2 shows a grating arrangement without a dedicated out-coupling grating.

FIG. 2 shows an example of such element without a dedicated out-coupling area. The waveguide 21 contains only the in-coupler 21, and the EPE gratings 23 and 24. The EPE grating 24 out-couples the rays turned by the EPE grating 23 and vice versa.

Figure 3A:
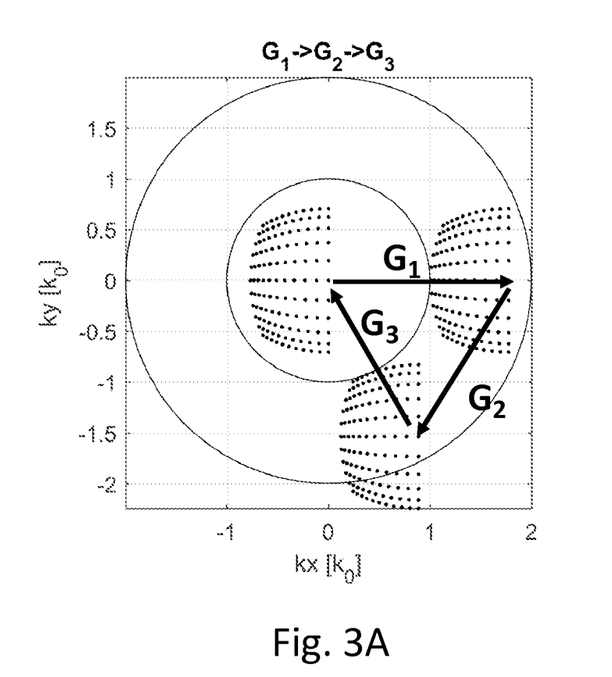
FIGS. 3A and 3B show wavevector diagram in the ($k_x$, $k_y$) plane for the grating arrangement of FIG. 2.
Figure 3B:
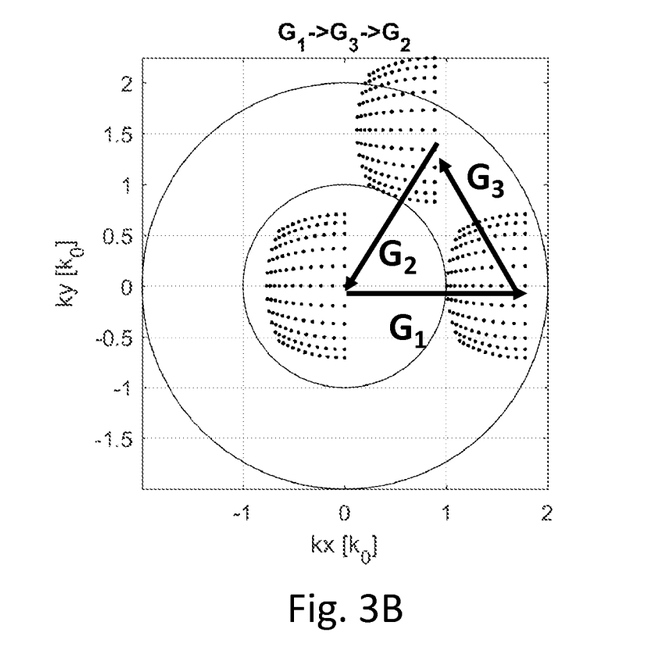

In a preferred configuration, the grating vectors of the in-coupler ($G_1$) and EPEs ($G_2$, $G_3$) are chosen so that that their sum is a zero vector. This is illustrated in FIGS. 3A and 3B for 50×90 deg (H×V) field of view.

In some embodiments, like that shown in FIG. 2, the first and second grating regions are arranged in non-overlapping manner on the same or different sides of the waveguide body.

In alternative embodiments, the first and second grating regions are arranged on different sides of the waveguide body so that they partially overlap each other in the main plane of the waveguide. This is beneficial for increasing the eyebox of the element.

Figure 4:
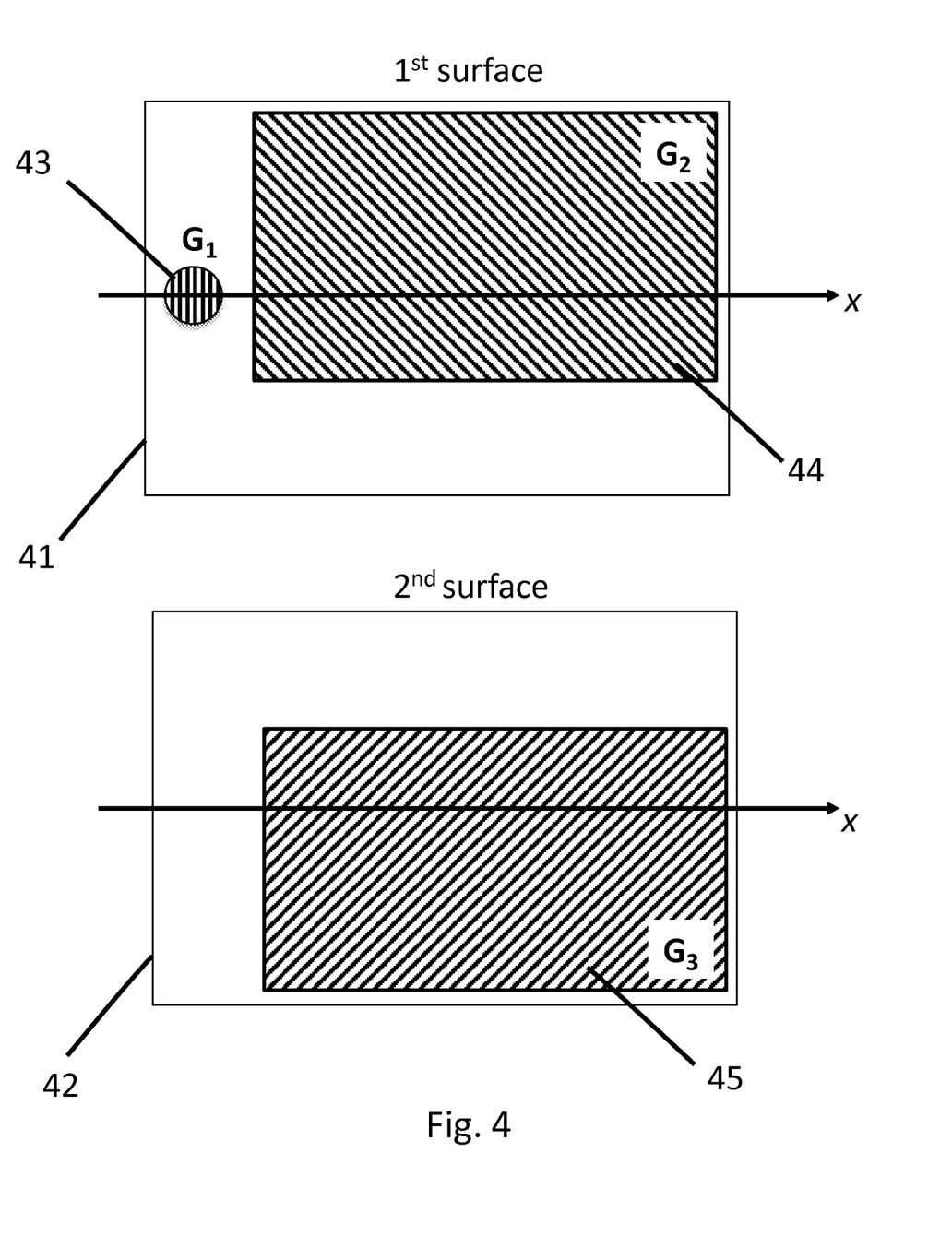
FIG. 4 shows a double-sided grating arrangement.

Indeed, in the grating arrangement of FIG. 2, the FOV points with small $k_y$ component suffer from the small eyebox. The eyebox problem can be fixed by placing EPE gratings on different sides of the waveguide and expanding them laterally so that they overlap in the center region. This is illustrated in FIG. 4, where the first waveguide surface 41 contains the in-coupler 43 and the EPE grating 44. The second waveguide surface 42 contains the second EPE grating 45.

The overlapping area can be e.g. 10-50% of the area of the first or second region, which are typically equally sized with respect to each other.

In all embodiments described above, the first and second gratings, as well as the in-coupling grating, can be linear, i.e. singly periodic, gratings, having a periodic diffractive pattern of parallel line structures.

Figure 5A:
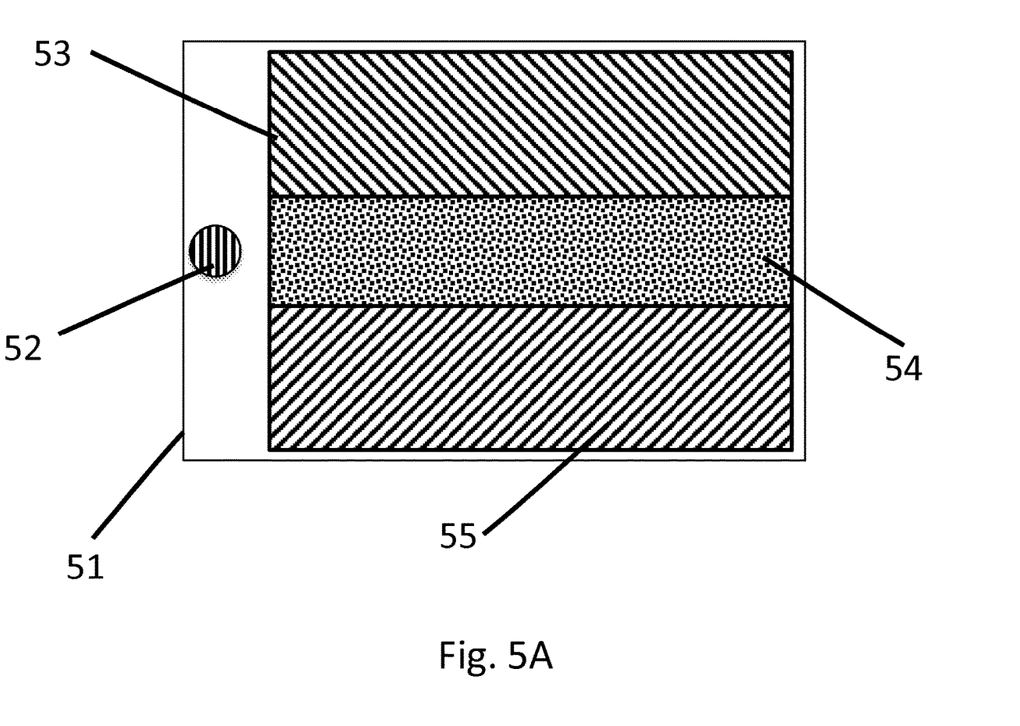
FIG. 5A shows a grating arrangement with 1D and 2D gratings.
Figure 5B:
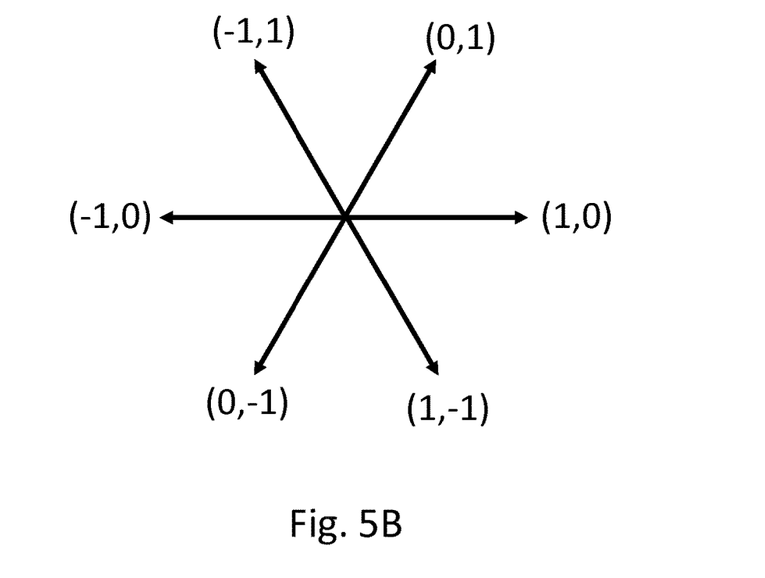
FIG. 5B shows possible diffraction orders produces by a hexagonal grating.

FIG. 5A illustrates another grating arrangement where the waveguide surface 51 contains the in-coupler 51, first and second EPE gratings 53, 55, and a doubly periodic (2D) third grating 54. The grating 54 can be a hexagonal grating with 6 propagation directions as shown in FIG. 5B.

More generally, in some embodiments the first and second grating regions are arranged at a distance from each other in the main plane of the waveguide, and there is provided a third grating region having a third grating between the first and second grating regions. The third grating is a doubly periodic grating, such as a hexagonal grating and can be positioned on the same side of the waveguide as the first and second grating regions.

In some applications, the exit pupil of rays having a small wave vector component in one dimension is expanded by an additional grating having a short period.

Thus, in further embodiments there is provided also a fourth grating region arranged on the opposite surface of the waveguide body, the fourth grating region comprising a fourth grating being configured to expand exit pupil of rays having a small wave vector component in one dimension. The fourth grating is typically a linear grating having a period smaller than the first and second gratings. In this case, there is also preferably provided doubly periodic in-coupling grating, such as a hexagonal grating, adapted to diffract light directed thereto from the outside of the waveguide body towards the first, second, third and fourth grating regions.

Figure 6:
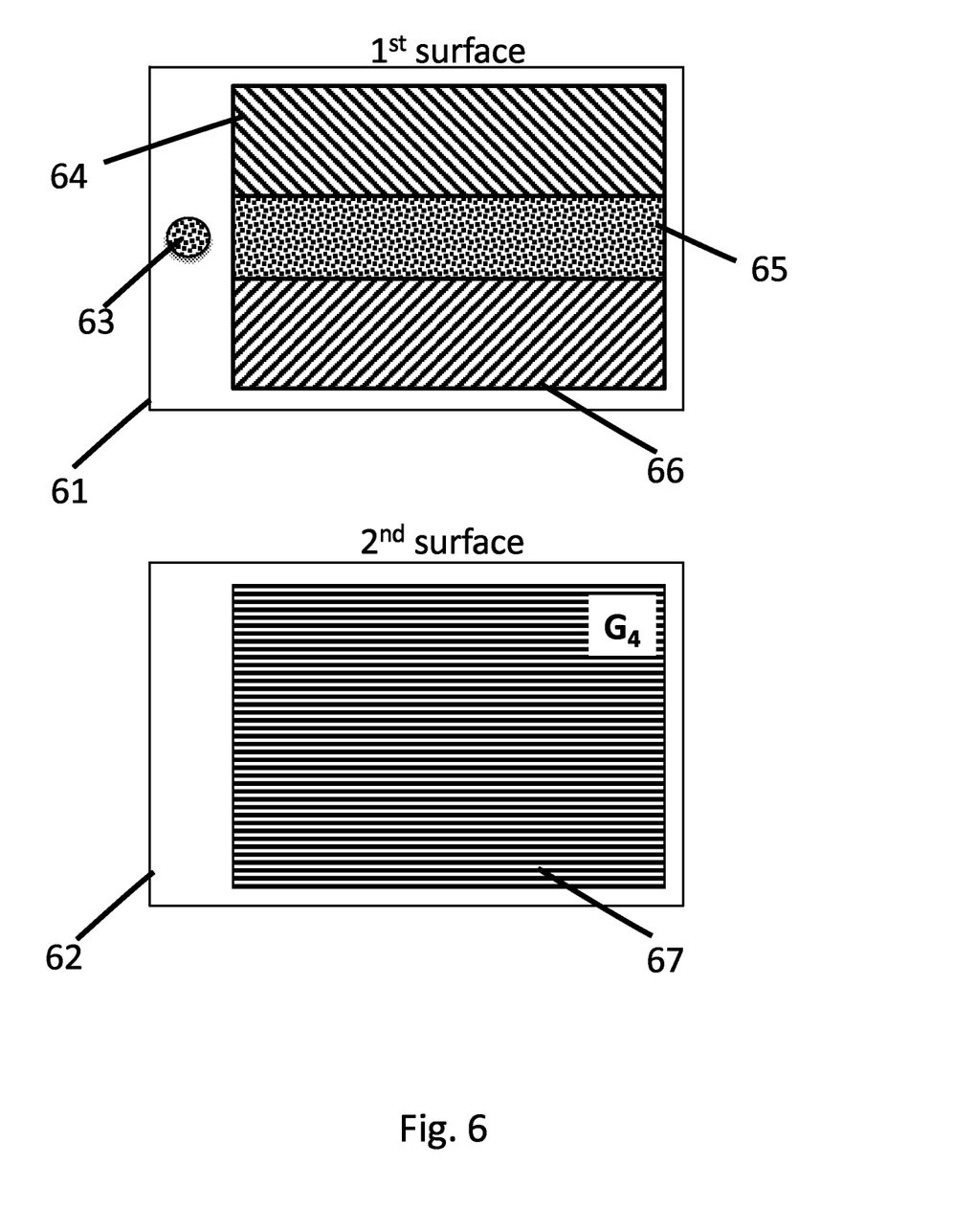
FIG. 6 shows a grating arrangement with the 2D in-coupler and a small period expansion grating on the second surface.
Figure 7:
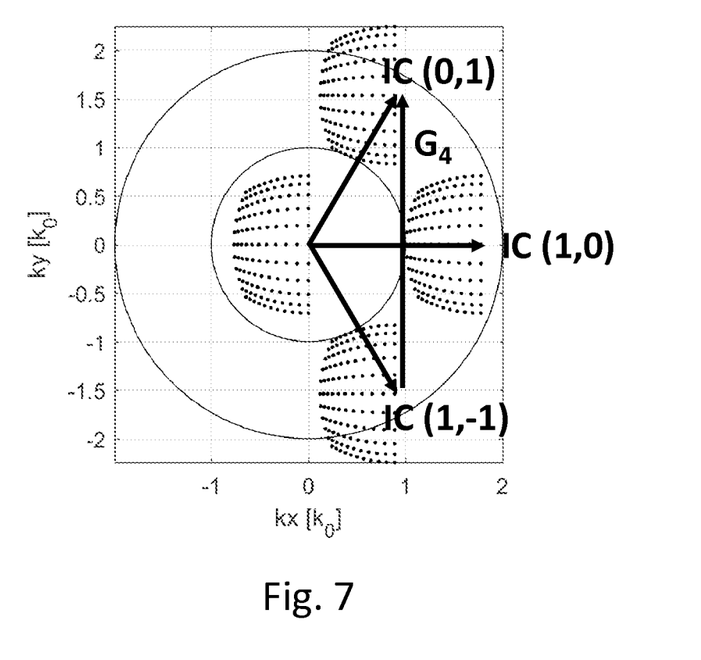
FIG. 7 shows wavevector diagram in the ($k_x$, $k_y$) plane for the in-coupler of FIG. 6 and the wavevector of the small period grating of the second surface.

FIG. 6 shows this kind of enhanced version of the grating arrangement of FIG. 5A. The first surface 61 of the waveguide contains the 2D in-coupler 63, first and second EPE gratings 64, 66, and a 2D third grating 65. The second surface 62 of the waveguide contains the fourth grating, i.e. a short period grating 67. The operation of the 2D in-coupler 63 and the short period grating 67 in the ($k_x$, $k_y$) space is shown in FIG. 7. The short period grating expands the exit pupil of FOV points with small $k_y$ component.

The term short period grating herein means a grating having a period shorter than the period of the first and second gratings. Thus, the grating is able to perform the do carry out the required small wave vector component exit pupil expansion.

The embodiments described above are directly suitable for one-projector display configurations and can be used to achieve a decent 50×90 deg (H×V) FOV propagation through the element. However, similar principles can be used to double the horizontal FOV in double-projector arrangements.

In some exemplary embodiments to this effect the first grating region is provided on first side of the waveguide body, the first grating region comprising a doubly periodic first grating, and the second grating region is provided on the opposite, second side of the waveguide body, overlapping or fully aligned with the first grating region, the second grating region comprising a linear second grating. There is also provided two doubly periodic in-coupling gratings adapted to diffract light directed thereto from the outside of the waveguide body towards the first and second grating regions from different laterla sides thereof. The in-coupling gratings are configured to couple different field-of-view components to the waveguide body. The in-coupling gratings are typically positioned on different sides of the element in the direction of grating lines of the second grating.

Figure 8:
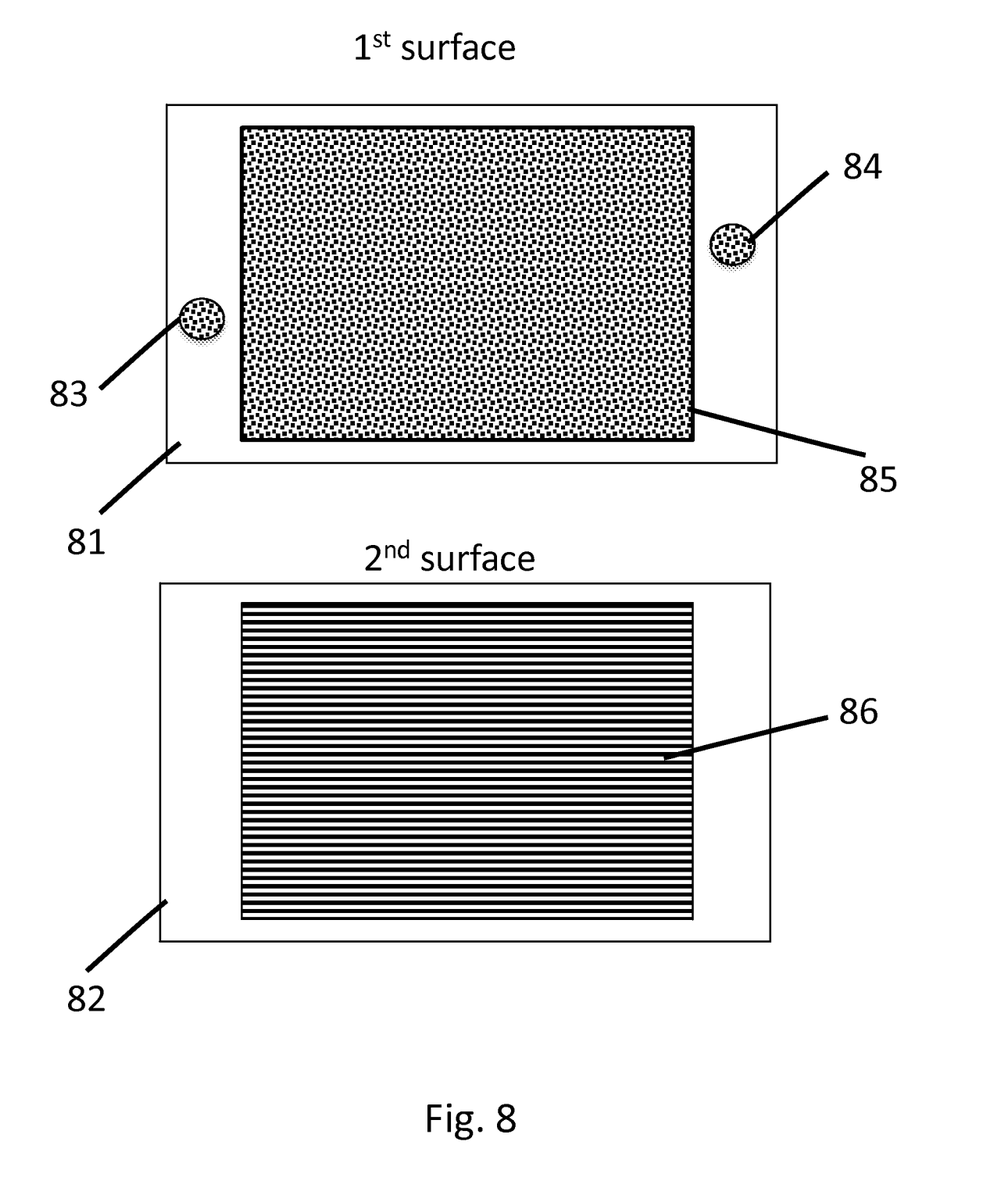
FIG. 8 shows another embodiment of the invention.

FIG. 8 illustrates this kind of increased-FOV grating arrangement where the first surface 81 of the waveguide contains 2D in-couplers 83, 84 and a single 2D EPE grating 85. The 2D gratings can be, for example, hexagonal gratings. The second surface 82 of the waveguide contains a small period grating 86. The FOV is split along the y-axis into two parts. FOV with negative $k_x$ components are fed into IC 83 and FOV with positive $k_x$ components are fed into IC 84. This arrangement allows to propagate 100×90 deg FOV inside the waveguide.

In some embodiments, like shown in FIG. 8, the in-coupling gratings are arranged non-aligned with each other in the direction perpendicular to the grating lines of the second grating. In some applications, it is desired achieve high FOV and simultaneously minimize so-called rainbow effects that the diffractive element produces in the presence of ambient light. To achieve this, in some embodiments the first grating region is provided on a first side of the waveguide body, the first grating region comprising a linear first grating, and there are provided one or more second gratings region on the opposite second side of the waveguide body, partially overlapping with the first grating region, the second grating region(s) comprising linear second grating(s) having grating vector(s) different from the first grating. In addition, there is provided two doubly periodic in-coupling gratings on the first side of the waveguide body and adapted to diffract light directed thereto from the outside of the waveguide body towards the first and second grating regions. In the non-overlapping region of the grating regions, there is only one linear grating present on one surface of the element, whereby rainbow effect is minimized.

The two in-coupling gratings are typically positioned on different sides of the first grating region in the direction perpendicular to the grating lines of the first grating, and symmetrically to the second grating regions. The second grating regions can overlap with the in-coupling grating to maximize efficiency.

In some embodiments, there are provided a plurality of second regions arranged so that a void, i.e. a region without grating, on the second side of the waveguide body remains aligned with the first grating region. The void produces minimal rainbow effect.

Figure 9:
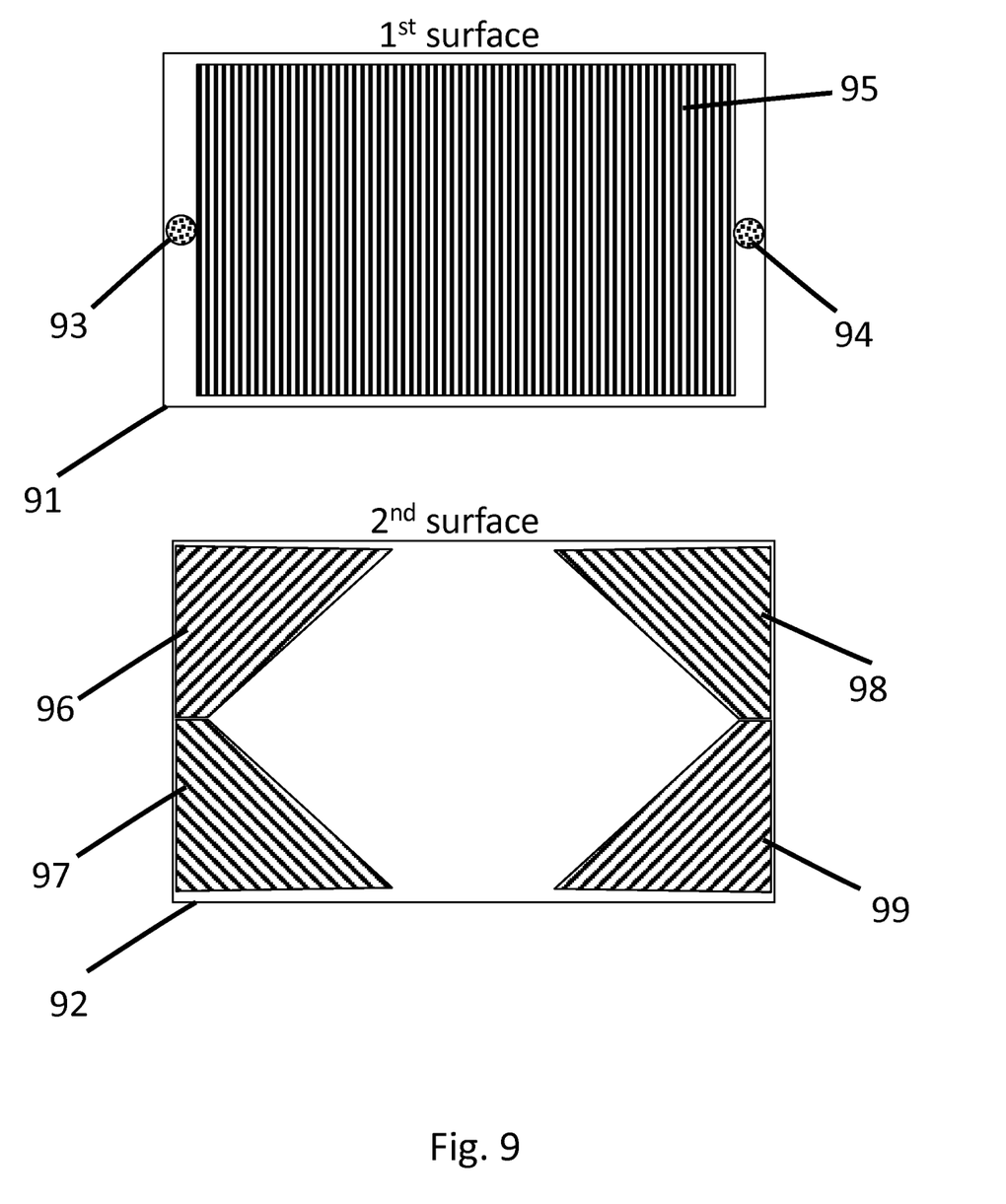
FIG. 9 shows still another embodiment of the invention.

These embodiments, utilizing FOV splitting used in FIG. 8 with two 2D ICs are illustrated in FIG. 9. The first surface 91 of the waveguide contains only 2D ICs 93, 94, and a linear grating 95. The second surface 92 contains four EPE gratings 96, 97, 98, 99. The in-couples can be hexagonal gratings, for example. An advantage of this approach is that the center part of the waveguide is covered only by a vertical linear grating that is not very sensitive to produce disturbing rainbow patterns due to ambient lighting.

In an alternative embodiment, the grating 95 on the first surface is a doubly periodic grating instead of a linear grating.

The EPE gratings 96, 97, 98, 99 can be positioned e.g. as shown in FIG. 9, i.e. on four different sides of the void area. Also the grating lines can be oriented as shown, i.e. "towards" the void area.

More generally, in all embodiments described above, one of the first and second grating regions may comprise or define a void, i.e. a region without grating, on one side of the waveguide body, aligned with a linear grating provided on the opposite side of the waveguide body to minimize the rainbow effect.

A common preferable feature of all embodiments described above is that the in-coupling grating(s) couple light to at least two different grating regions having different grating configurations represented by their grating vectors so that their co-effect is exit pupil expansion and out-coupling simultaneously at each or several locations of the regions. As shown, the regions can locate laterally to each other on the same surface of the waveguide, e.g. abutting each other, or partially or entirely overlapping with each other on different surfaces of the waveguide. The gratings configurations may be singly or doubly periodic as long as they interact as described herein.

The waveguide body can be e.g. a high refractive index ($\geq 1.7$, such as $\geq 2.0$) body of e.g. glass and having a planar or curved shape.

The present element can be used in a personal display device, such as near-to-eye glasses, other augmented reality displays, such as head-mounted displays, or head-up displays.

The invention s in no way limited to the examples described above but is to be interpreted in full scope of the claims.

CITATIONS LIST

Patent Literature

US 2016/0231568 A1

The invention claimed is:
1. A diffractive waveguide element for a personal display device, comprising:
a waveguide body, and
at least two grating regions arranged on the waveguide body, at least some of the grating regions adapted to expand the exit pupil of the element,
wherein:
the grating regions are positioned with respect to each other and are provided with gratings having different grating vectors so that the grating regions interact to combine the functions of exit pupil expansion and out-coupling on at least some parts of the element,
a first and a second grating regions are arranged at a distance from each other in the main plane of the waveguide,
there is provided a third grating region having a third grating between the first and second grating regions,
the third grating is a doubly periodic grating,
the first, second and third grating regions are arranged on the same side of the waveguide body, and
there is a fourth grating region arranged on the opposite surface of the waveguide body, the fourth grating region comprising a fourth grating being configured to expand exit pupil of rays having a small wave vector component in one dimension, wherein the fourth grating is a linear grating having a period smaller than the first and second gratings.
2. The element according to claim 1, wherein:
the first grating region is provided with the first grating, the first grating region being positioned on a first location of the waveguide body, and
the second grating region is provided with the second grating, the second grating region being positioned on a second location of the waveguide body, different from the first location,
whereby the second grating is arranged to out-couple rays turned by the first grating and vice versa.
3. The element according to claim 2, further comprising an in-coupling grating adapted to diffract light directed thereto from the outside of the waveguide body towards the first and second grating regions, the in-coupling grating, first grating and second grating being chosen so that their sum grating vector is a zero vector.
4. The element according to claim 2, wherein the fourth grating region is arranged in non-overlapping manner to the first, second or third grating region on the different side of the waveguide body.
5. The element according to claim 2, wherein the grating regions are arranged on different sides of the waveguide body so that the fourth grating region partially overlaps the first, second and third grating regions in the main plane of the waveguide.
6. The element according to claim 2, wherein the first, and/or second gratings are linear gratings.

7. The element according to claim 1, wherein the fourth grating region is arranged in non-overlapping manner to the first, second or third grating region on the different side of the waveguide body.

8. The element according to claim 1, wherein the grating regions are arranged on different sides of the waveguide body so that the fourth grating region partially overlaps the first, second and third grating regions in the main plane of the waveguide.

9. The element according to claim 1, wherein the first and/or second gratings are linear gratings.

10. The element according to claim 1, wherein the doubly periodic grating is as a hexagonal grating.

11. The element according to claim 10, further comprising at least one doubly periodic in-coupling grating adapted to diffract light directed thereto from the outside of the waveguide body towards the first, second, third and fourth grating regions.

12. The element according to claim 11, further comprising two such in-coupling gratings arranged on different lateral sides of the first and second grating regions.

13. The element according to claim 12, wherein the in-coupling gratings are arranged non-aligned with each other on different lateral sides of the first and second grating regions.

14. The element according to claim 1, wherein one of the grating regions comprises a void on one side of the waveguide body, aligned with a linear grating provided on the opposite side of the waveguide body.

15. A personal display device comprising:
a waveguide element according to claim 1, and
at least one projector for directing an image on the in-coupling grating, from which it is diffracted into the waveguide and proceeds to the first and second grating regions, where the exit pupil is expanded and image out-coupled due to the first and second gratings.

16. A method of providing an image on a personal see-through display device, the method comprising:
providing the diffractive waveguide element of claim 1;
coupling an image into the waveguide body using an in-coupler as propagating rays,
allowing the exit pupil of a first part of the in-coupled propagating rays to expand in the waveguide by means of the first grating arranged on the waveguide body, from which the expanded rays propagate to the second grating arranged on the waveguide body and having a different grating vector than the first grating so as to out-couple therefrom,
allowing the exit pupil of a second part, different from the first part, of the in-coupled propagating rays to expand in the waveguide by means of the second grating, from which the expanded rays propagate to the first grating so as to out-couple therefrom, and
allowing the exit pupil of rays having a small wave vector component in one dimension to be expanded by the fourth grating.

17. The element according to claim 1, further comprising at least one doubly periodic in-coupling grating adapted to diffract light directed thereto from the outside of the waveguide body towards the first, second, third and fourth grating regions.

* * * * *